(12) United States Patent
Kushwaha et al.

(10) Patent No.: US 12,470,538 B2
(45) Date of Patent: Nov. 11, 2025

(54) IOT BOOTSTRAPPING AND CERTIFICATE MANAGEMENT USING ZERO-TOUCH DEPLOYMENT (ZTD) SERVICES

(71) Applicant: Cisco Technology, Inc., San Jose, CA (US)

(72) Inventors: Manoj Kumar Kushwaha, Karnataka (IN); Scott Taft Potter, Stratford, CT (US); David Scott McCowan, Cary, NC (US); Shailendra Bhargava, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 242 days.

(21) Appl. No.: 18/049,245

(22) Filed: Oct. 24, 2022

(65) Prior Publication Data
US 2023/0198977 A1 Jun. 22, 2023

(30) Foreign Application Priority Data
Dec. 31, 2021 (IN) .............................. 202141062109

(51) Int. Cl.
*H04L 9/40* (2022.01)
*G06F 9/4401* (2018.01)

(52) U.S. Cl.
CPC ........ *H04L 63/0823* (2013.01); *G06F 9/4416* (2013.01); *H04L 63/0892* (2013.01); *H04L 63/107* (2013.01); *H04L 63/20* (2013.01)

(58) Field of Classification Search
CPC ............. H04L 63/0823; H04L 63/0892; H04L 63/107; H04L 63/20

USPC .......................................................... 726/1
See application file for complete search history.

(56) References Cited

U.S. PATENT DOCUMENTS

| 11,800,351 B2* | 10/2023 | Fekih Ahmed ..... H04W 12/043 |
| 2019/0036896 A1* | 1/2019 | Khushu ................... H04L 63/08 |
| 2020/0065473 A1* | 2/2020 | Berdy ..................... G06F 21/73 |
| 2020/0153697 A1* | 5/2020 | Turner ................ H04L 63/0823 |
| 2020/0204538 A1 | 6/2020 | Friel |
| 2021/0267839 A1 | 9/2021 | Watson et al. |
| 2021/0297493 A1 | 9/2021 | Seed et al. |
| 2021/0352472 A1 | 11/2021 | Ganesan et al. |

OTHER PUBLICATIONS

Lightweight CoAP-Based Bootstrapping Service for the Internet of Things, Garcia-Carrillo et al., Mar. 2016 (Year: 2016).*
B. Sarikaya et al., "Secure IoT Bootstrapping: A Survey," Sep. 19, 2018, pp. 1-13.

* cited by examiner

*Primary Examiner* — Jahangir Kabir
(74) *Attorney, Agent, or Firm* — Polsinelli P.C.

(57) ABSTRACT

The present disclosure is directed to techniques for bootstrapping and certificate management of Internet of Things (IoT) devices using a zero-touch deployment (ZTD) service. In one aspect, a method of managing Internet of Thing (IoT) devices includes receiving, at an IoT management component, a bootstrapping request from an IoT device, the request including location information of the IoT device; receiving, from a controller, credential information for the IoT device; generating a policy for bootstrapping the IoT device based at least on the location information and the credential information; and sending the policy to the IoT device for the IoT device to complete the bootstrapping.

12 Claims, 10 Drawing Sheets

IOT BOOTSTRAPPING AND CERTIFICATE MANAGEMENT USING ZERO-TOUCH DEPLOYMENT (ZTD) SERVICES

CROSS-REFERENCE TO RELATED APPLICATIONS

This application claims the benefit of priority to Indian Provisional Patent Application No. 202141062109, filed Dec. 31, 2021 and entitled "IOT BOOTSTRAPPING AND CERTIFICATE RE-ENROLLMENT USING ZERO TOUCH DEPLOYMENT SERVICES," the disclosure of which is herein incorporated by reference in its entirety.

TECHNICAL FIELD

The present technology pertains to wireless networks, and more particularly to providing bootstrapping and certificate management of Internet of Things (IoT) devices using a zero-touch deployment (ZTD) service.

BACKGROUND

As Internet-of-Things (IoT) devices continue to grow in popularity, so too may the complexity of many IoT deployments. For example, enterprise IoT deployments may include thousands of different IoT devices, many of which consume wireless data and/or interact with multiple different networked entities. Moreover, different IoT devices may have different data usage patterns, data usage requirements, etc., all of which pose a challenge to ensuring that the varying needs of deployed IoT devices are being met. In some cases, the data consumption and/or data requirements of a given IoT device can change over time, for example when a IoT device is utilized for a new or different task.

The complexity of managing a fleet of deployed IoT devices, along with the complexity of managing the IoT device interactions with supporting infrastructure (e.g., databases), can be challenging to perform. The complexity of such tasks may grow non-linearly with factors that include, but are not limited to, the size of the IoT fleet deployment, the age of the deployment (e.g., the number of IoT devices deployed), the tasks performed by the IoT devices, the environment in which the IoT devices are deployed, the network entities to which the IoT devices are communicatively coupled, etc.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are therefore not to be considered to be limiting of its scope, the principles herein are described and explained with additional specificity and detail through the use of the accompanying drawings in which.

DETAILED DESCRIPTION

Figure 1:
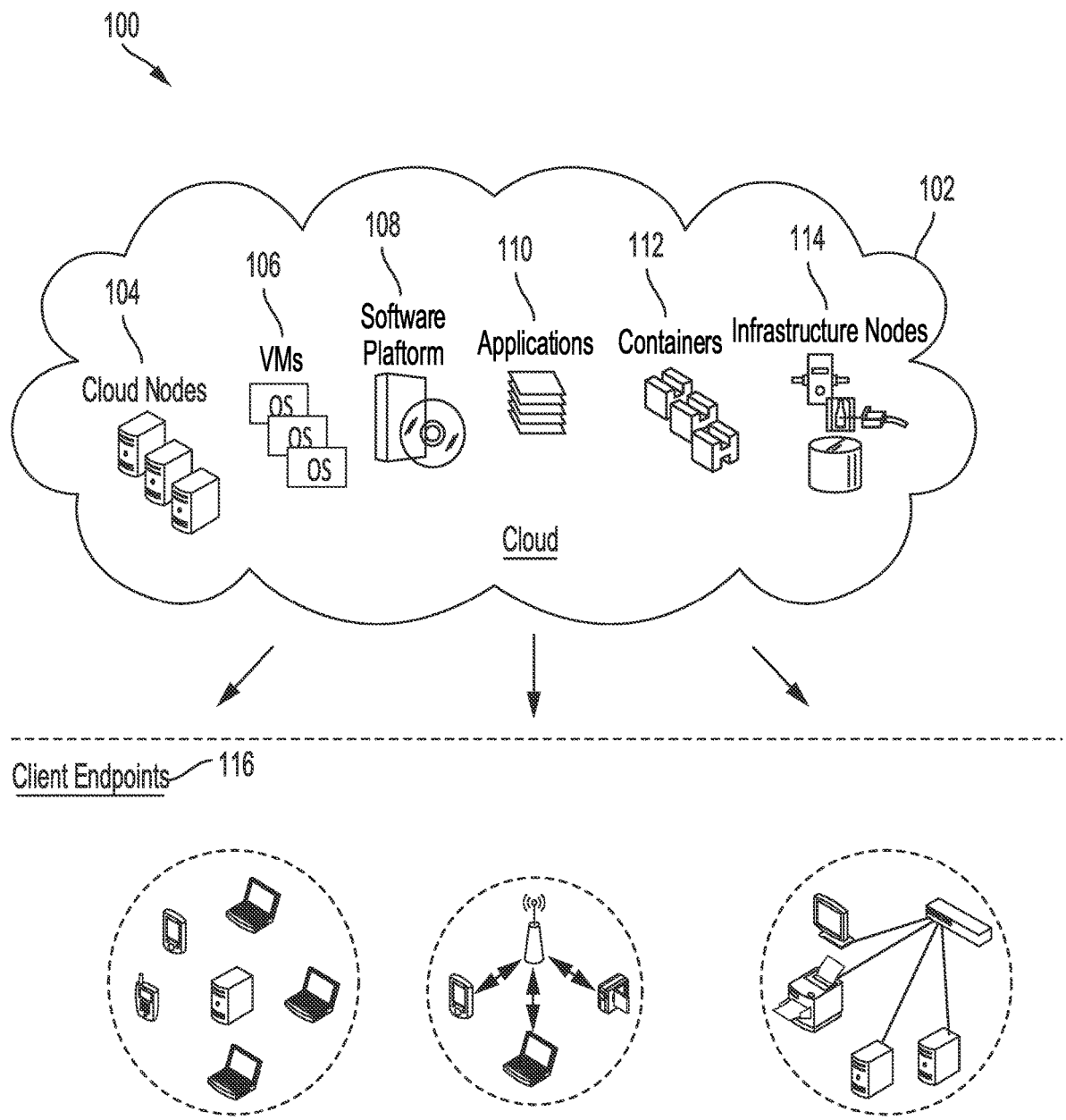
FIG. 1 illustrates an example cloud computing architecture, according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed are systems, apparatuses, methods, and computer-readable media for extending bootstrapping of IoT devices when attempting to connect to a zero-touch deployment (ZTD) service to provide bootstrapping and certificate renewal information (credential information) that may enable an IoT device to perform tasks such bootstrapping, maintaining the validity of the IoT device's certificate during enrollment with the ZTD service, and/or verifying firmware, software, data, and other information received from a third party out-of-band of the original ZTD bootstrap service without having to re-establish trust between the IoT device and the ZTD service. The credential information can include, but is not limited to, location information of the IoT device, a secure boot key, software sign/verify keys, pre-shared encryption keys, license keys, or other credentials, information including parameters for certificate renewal/validity, etc.

In one aspect, a method of managing Internet of Thing (IoT) devices includes receiving, at an IoT management component, a bootstrapping request from an IoT device, the request including location information of the IoT device; receiving, from a controller, credential information for the IoT device; generating a policy for bootstrapping the IoT device based at least on the location information and the credential information; and sending the policy to the IoT device for the IoT device to complete the bootstrapping.

In another aspect, the credential information includes digital keys for managing one or more of software updates or information associated with the IoT device.

In another aspect, the credential information includes one or more device policies associated with the IoT device.

In another aspect, the device policy identifies a duration of validity of a digital certificate associated with the IoT device.

In another aspect, the one or more device policies are location dependent.

In another aspect, the method further includes comparing the location information with second location information received from the controller to determine if bootstrapping the IoT device is authorized.

In another aspect, the policy includes a device certificate re-enrollment policy.

In another aspect, the IoT device performs a certificate re-enrollment process based on a triggering condition identified in the re-enrollment policy.

In one aspect, a network controller includes one or more memories having computer-readable instructions stored thereon and one or more processors. The one or more processors are configured to execute the computer-readable instructions to receive a bootstrapping request from an IoT device, the request including location information of the IoT device; receive, from a controller, credential information for the IoT device; generate a policy for bootstrapping the IoT device based at least on the location information and the credential information; and send the policy to the IoT device for the IoT device to complete the bootstrapping.

In one aspect, one or more non-transitory computer-readable media include computer-readable instructions, which when executed by one or more processors of a network controller, cause the network controller to receive a bootstrapping request from an IoT device, the request including location information of the IoT device; receive, from a controller, credential information for the IoT device; generate a policy for bootstrapping the IoT device based at least on the location information and the credential information; and send the policy to the IoT device for the IoT device to complete the bootstrapping.

Example Embodiments

In some examples, an IoT deployment can be provided as a cellular IoT deployment, in which IoT devices are connected to and/or communicate with a wireless cellular network. Cellular IoT (Internet-of-Things) deployments may involve three primary entities or groups of devices. The first entity is a cellular service provider. For example, the cellular service provider can be the owner or operator of a cellular network. The second entity comprises a plurality of enterprise devices (e.g., IoT devices). The IoT devices connect to the cellular service provider and consume data using the cellular service provider's network. The third entity comprises IoT hubs and/or collection datacenters.

IoT hubs can receive data transmitted by the IoT devices over the cellular service provider's network. For example, the IoT hubs can be public IoT hubs or private data centers. The IoT hubs can manage the sending and storage of IoT and/or telemetry data from the IoT devices. For example, the IoT hubs can impose traffic restrictions to meter or limit the flow of input data received from the IoT devices (e.g., a traffic restriction might limit an IoT device to 100 MB of cellular data usage per day). The IoT hubs can also manage data consumption charges.

Although all three entities may be involved in implementing or otherwise providing cellular IoT deployments, these three entities may not work in a collaborative or synchronized fashion. In other words, several problems have not yet been addressed in terms of synchronization between these three entities and in terms of management of deployed IoT devices. For example, existing approaches for cellular IoT deployments have not addressed the challenge of providing correlation or synchronization between IoT hubs users (e.g., enterprises, businesses, individuals, etc.) that operate IoT devices. In some cases, traffic management or traffic restriction policies can be established during the initial configuration and deployment of an enterprise's IoT devices, but these policies are difficult or impossible to dynamically reconfigure at a later time, for example leading to data loss when an IoT device becomes traffic-restricted. Moreover, the lack of synchronization between IoT hubs and operators of IoT devices results in the IoT device operators (e.g., enterprises) having no way to account for changes over time in the data usage or consumption patterns of their already deployed IoT devices.

Therefore, there exists a need for an IoT device deployment and/or management tool that can provide efficient, reliable, flexible, and/or adaptive management of network traffic control policies for a plurality of deployed IoT devices. There is also a need for an IoT device deployment and/or management tool that can enable IoT devices, to utilize an initial trust relationship established between an IoT device and a ZTD service during zero-touch deployment (ZTD), to perform a number of post-authentication functions such as updating firmware, software, determining, maintaining the validity of the IoT device's certificate, etc.

In order to do, disclosed herein are systems, apparatuses, methods, and computer-readable media for extending bootstrapping of IoT devices when attempting to connect to a zero-touch deployment (ZTD) service to provide bootstrapping and certificate renewal information (credential information) that may enable an IoT device to perform tasks such as bootstrapping, maintaining the validity of the IoT device's certificate during enrollment with the ZTD service, and/or verifying firmware, software, data, and other information received from a third party out-of-band of the original ZTD bootstrap service without having to re-establish trust between the IoT device and the ZTD service. The credential information can include, but is not limited to, location information of the IoT device, a secure boot key, software sign/verify keys, pre-shared encryption keys, license keys, or other credentials, information including parameters for certificate renewal/validity, etc.

Figure 2:
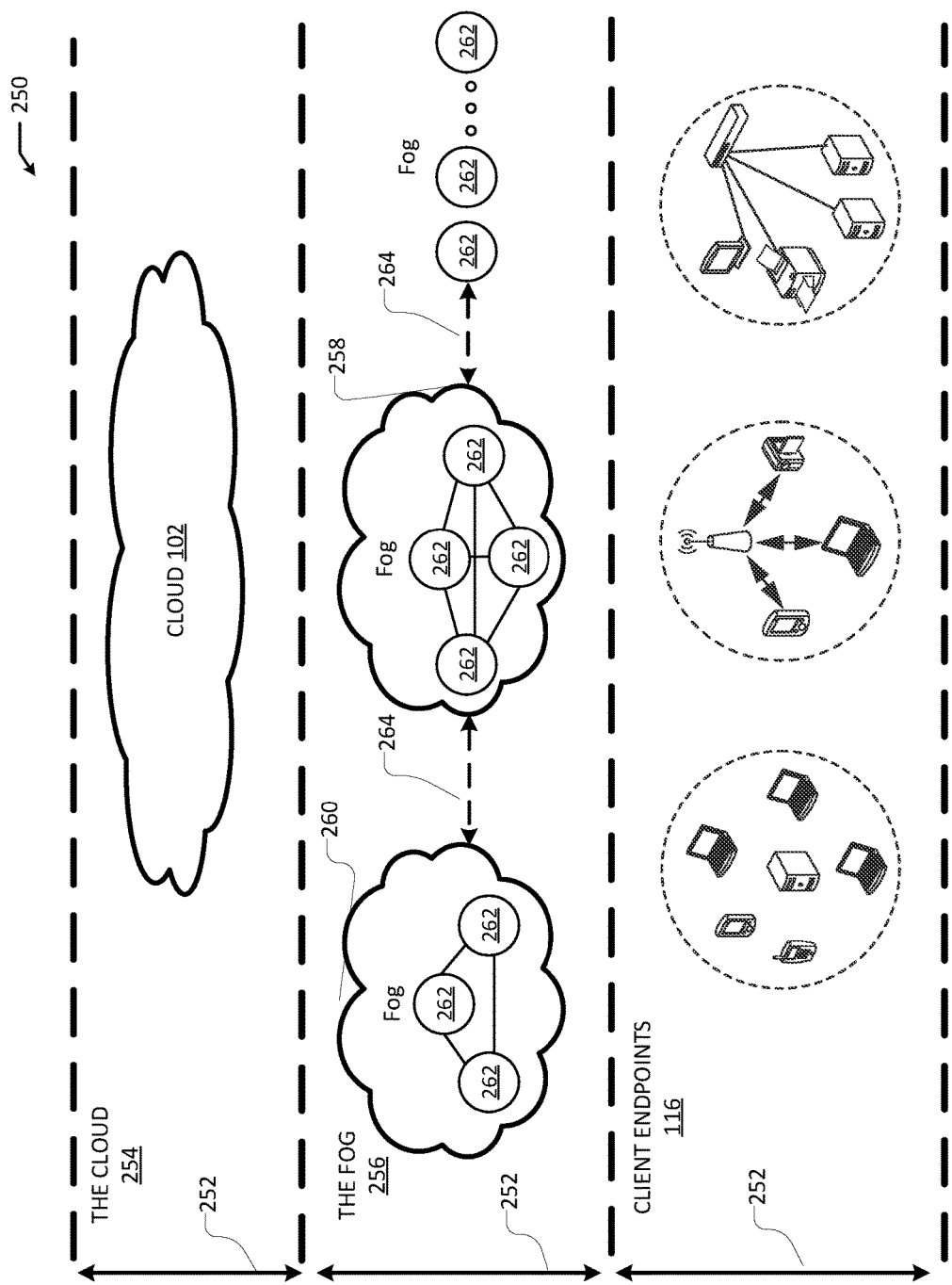
FIG. 2 illustrates an example fog computing architecture, according to some aspects of the present disclosure.

A description of example network environments and architectures for network data access and services, as illustrated in FIGS. 1 and 2, is first disclosed herein. One or more examples of a ZTD architecture and ZTD agent are described with reference to FIGS. 3 and 4. An example network environment and associated network flow for IoT bootstrapping and certificate enrollment management are described with reference to FIGS. 5A-5D and 6. The discussion then concludes with a brief description of example devices, as illustrated in FIG. 7.

FIG. 1 illustrates an example cloud computing architecture, according to some aspects of the present disclosure. Cloud computing architecture 100 can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 2 illustrates an example fog computing architecture, according to some aspects of the present disclosure. The fog computing architecture 250 can include the cloud layer 254, which includes the cloud 102 of FIG. 1 and any other cloud system or environment, and the fog layer 256, which includes fog nodes 262. The client endpoints 116 (same as in FIG. 1) can communicate with the cloud layer 254 and/or the fog layer 256. The architecture 250 can include one or more communication links 252 between the cloud layer 254, the fog layer 256, and the client endpoints 116. Communications can flow up to the cloud layer 154 and/or down to the client endpoints 116.

The fog layer 256 or "the fog" provides the computation, storage and networking capabilities of traditional cloud networks, but closer to the endpoints. The fog can thus extend the cloud 102 to be closer to the client endpoints 216. The fog nodes 262 can be the physical implementation of fog networks. Moreover, the fog nodes 262 can provide local or regional services and/or connectivity to the client endpoints 116. As a result, traffic and/or data can be offloaded from the cloud 102 to the fog layer 256 (e.g., via fog nodes 262). The fog layer 256 can thus provide faster services and/or connectivity to the client endpoints 116, with lower latency, as well as other advantages such as security benefits from keeping the data inside the local or regional network(s).

The fog nodes 262 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 262 can be deployed within fog instances 258, 260. The fog instances 258, 258 can be local or regional clouds or networks. For example, the fog instances 256, 258 can be a regional cloud or data center, a local area network, a network of fog nodes 262, etc. In some configurations, one or more fog nodes 262 can be deployed within a network, or as standalone or individual nodes, for example. Moreover, one or more of the fog nodes 262 can be interconnected with each other via links 264 in various topologies, including star, ring, mesh or hierarchical arrangements, for example.

In some cases, one or more fog nodes 262 can be mobile fog nodes. The mobile fog nodes can move to different geographical locations, logical locations or networks, and/or fog instances while maintaining connectivity with the cloud layer 254 and/or the endpoints 116. For example, a particular fog node can be placed in a vehicle, such as an aircraft or train, which can travel from one geographical location and/or logical location to a different geographical location and/or logical location. In this example, the particular fog node may connect to a particular physical and/or logical connection point with the cloud 254 while located at the starting location and switch to a different physical and/or logical connection point with the cloud 254 while located at the destination location. The particular fog node can thus move within particular clouds and/or fog instances and, therefore, serve endpoints from different locations at different times.

Figure 3:
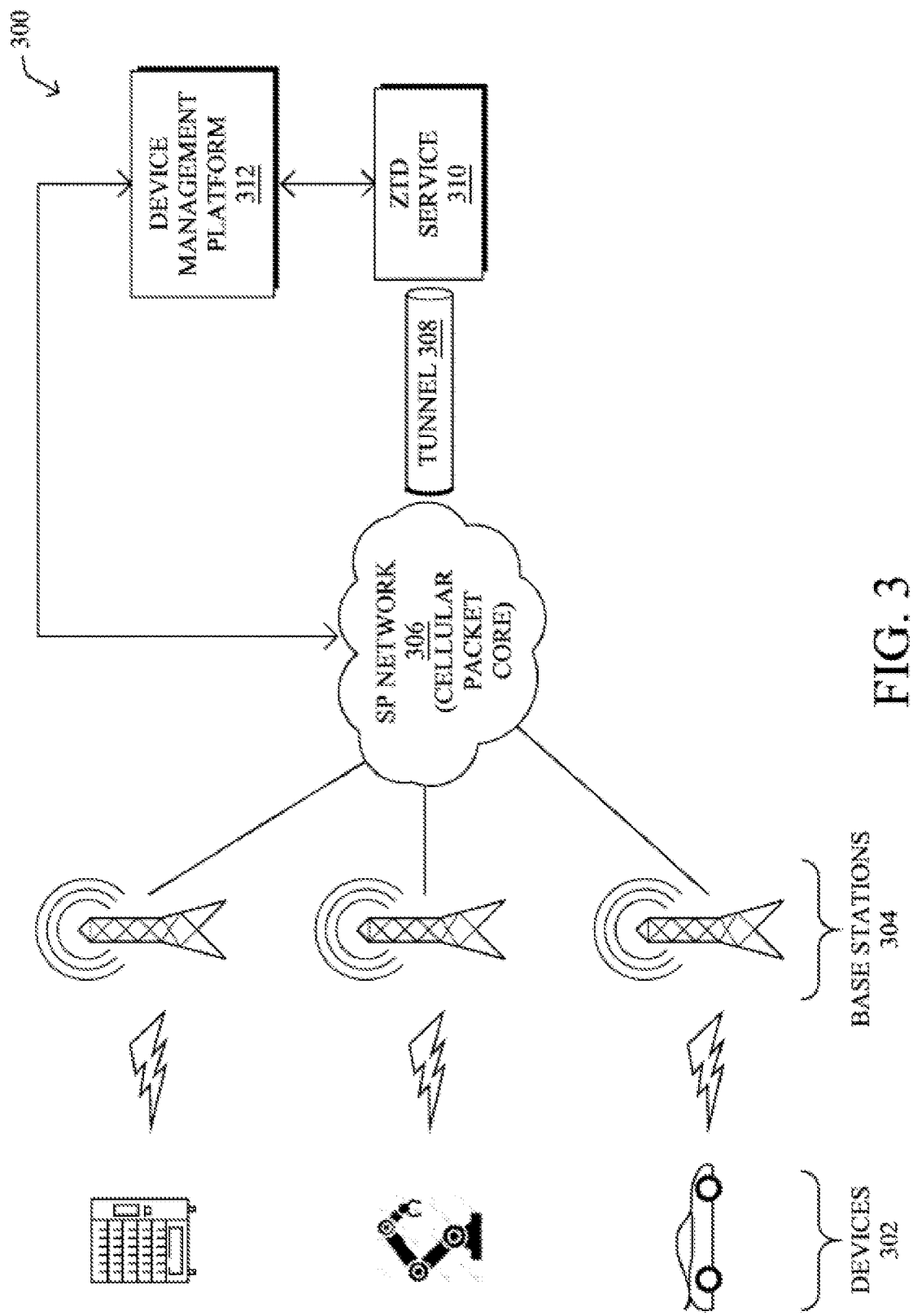
FIG. 3 illustrates an example architecture for zero-touch deployment (ZTD) of network devices, according to some aspects of the present disclosure.

FIG. 3 illustrates an example architecture for the zero-touch deployment (ZTD) of network devices, according to some aspects of the present disclosure. Architecture 300 may include any number of IoT devices 302 that are to be onboarded to a device management platform 312, such as Control Center developed by Cisco Systems, Inc., or the like. In some examples, onboarding of base stations 304 to device management platform 312 may be facilitated by a ZTD service 310 that communicates with IoT devices 302 via a cellular network that comprises any number of base stations 304 (e.g., cell towers, e-NodeBs, etc.) and a service provider (SP) network 306 that functions as the packet core for the cellular network. It is noted that, while ZTD service 310 and device management platform 312 are shown as distinct entities in architecture 300, in some cases the function(s) of ZTD service 310 and/or device management platform 312 may be combined or omitted.

In some examples, the IoT devices 302 can include, but are not limited to, cellular phones, laptops, tablets, vending equipment, automation equipment, vehicles, sensors (e.g., temperature sensors, pressure sensors, humidity sensors, etc.), actuators, drones, other forms of IoT devices, and the like. The IoT devices 302 may be the same as client endpoints 116 described above with reference to FIGS. 1 and 2. In some cases, each IoT device 302 may be configured to communicate via a cellular connection with a cellular network. Accordingly, each IoT device 302 may include a subscriber identification module (SIM) card, eSIM, iSIM, or the like.

Subscriber identification module (SIM) cards can be removable cards that store the authentication information needed for a device (e.g., IoT devices 302) to access a cellular network. For example, the authentication information can include a device's international mobile subscriber identity (IMSI) number, integrated circuit card ID (ICCID), etc. There is a well-developed procurement, deployment, and authentication process that scales to billions of cellular connected IoT devices. In some examples, this process can be leveraged to implement ZTD by using the SIM as the root of trust for purposes of bootstrapping onboarding of the IoT device(s) 302 to a corresponding management platform 312.

In some cases, SIMS may be owned by service providers (e.g., also referred to as mobile network operators). In some examples, eSIMs can be used to provide switching between service providers without needing to physically swap SIM cards. Instead of taking the form of a removable card, an eSIM can be provided as a much smaller chip that is permanently soldered onto the device. In addition, eSIMs support remote management, which can allow an administrator to easily change the account or profile of a given device and/or migrate the device to a different cellular network.

iSIMs can additionally, or alternatively, be utilized according to one or more examples of the present disclosure. Like eSIMs, iSIMs can be integrated directly into a device (e.g., IoT device(s) 302) and are non-swappable. iSIMs can also support remote management for use in IoT devices such as the IoT devices 302. In some cases, an iSIM may require less supporting hardware than an eSIM. For example, eSIMs may typically require their own processors and other hardware components, which can increase the hardware footprint of an associated device considerably. iSIMs can be provided in a manner that is further integrated into the hardware of their associated devices (e.g., as part of an overall System-on-a-Chip (SoC) solution for the device).

In one illustrative example, leveraging the procurement, deployment, and the authentication processes of SIM/eSIM/iSIM/etc. to bootstrap ZTD can eliminate many friction points that exist in current cellular device onboarding processes. For example, to initiate an onboarding process, each IoT device 302 may execute a ZTD agent that interfaces with the SIM/eSIM/iSIM/etc. of the IoT device 302 to be onboarded.

Figure 4:
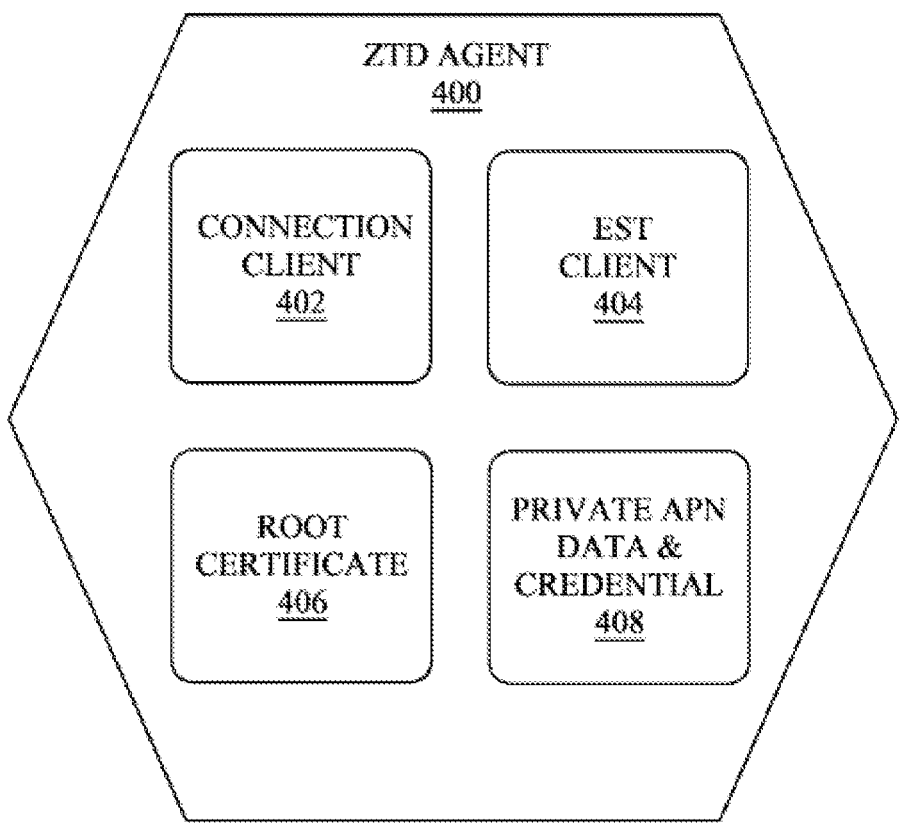
FIG. 4 illustrates an example ZTD agent, according to some aspects of the present disclosure.

FIG. 4 illustrates an example ZTD agent, according to some aspects of the present disclosure. As illustrated, ZTD agent 400 may include any or all of the following sub-components: a connection client 402, an Enrollment over Secure Transport (EST) client 404, a root certificate 406, and/or a private APN data and credential 408. In some examples, one or more of the sub-components 402-408 can be combined, omitted, or integrated into other processes, without departing from the scope of the present disclosure.

In one illustrative example, ZTD agent 400 can be installed to an endpoint device (e.g., one or more of the IoT devices 302 illustrated in FIG. 3) during the manufacture of the endpoint device. In some aspects, ZTD agent 400 can be used across any number of different end users/entities and deployments (e.g., companies, schools, governments, etc.) without requiring customization specific to a particular end user/entity and/or deployment. In some examples, ZTD agent 400 can be provided or otherwise utilized without the need for the manufacturer to install one or more certificates.

During the onboarding process, connection client 402 can be used to establish an initial connection between a device executing the ZTD agent 400 (e.g., an IoT device 302) and a ZTD service. For example, with reference to the examples of FIGS. 3 and 4, the connection client 402 executed by an IoT device 302 can cause the IoT device 302 to connect with a corresponding base station 304 and send a registration request to ZTD service 310.

In some examples, EST client 404 can be used to manage and request the installation of certificates to the device executing ZTD agent 400. For example, EST client 404 can manage and/or request the installation of one or more certificates that are associated with an entity (e.g., an enterprise or other user) that owns the IoT device 302. Details on the EST protocol can be found in the Internet Engineering Task Force (IETF) Request for Comments 7030 entitled, "Enrollment over Secure Transport" by Pritiken, et al. In some examples, EST client 404 can be provided as another client sub-component of ZTD agent 400 that relies on another certificate management protocol.

IoT Device 302, via ZTD agent 400, can use root certificate 406 to authenticate a corresponding service. Such a certificate may be issued by a certificate authority (CA), in accordance with a public key infrastructure framework.

Private APN data and credentials 408 can be used by ZTD agent 400 to connect its device to a private APN operated by the cellular carrier and associated with the ZTD service. For example, as illustrated in FIG. 3, the ZTD agent (e.g., ZTD agent 400) of an IoT device 302 may supply the private APN and credentials 408 to the IoT device 302, such that the IoT device 302 can connect to an APN associated with the provider of ZTD service 310. In some examples, the private APN can allow the IoT device 302 to access the cellular carrier's network 306 via a minimal data plan for purposes of onboarding the IoT device 302. As a result, in some examples a secure tunnel 308 associated with the APN can be formed with ZTD service 310. In some cases, network services such as Domain Name System (DNS) services, Dynamic Host Configuration Protocol (DHCP) services, etc., in network 306 can be controlled in this captive network.

From the standpoint of ZTD service 310, the above approach can help ensure network security, as only allowed/known IoT devices 302 (e.g., devices with known SIMs) can connect to ZTD service 310 through a corresponding tunnel 308 connecting the service provider (SP) network 306 to that of ZTD service 310. In some examples, one or more of the IoT devices 302 may be known via their SIM/eSIM/iSIM information, which is also known by the device management platform 312 via its SIM onboarding workflow.

In some examples, the IoT devices 302 effectively connect to a private ZTD network using private APN and a virtual private network (VPN) tunnel 308, and ZTD services from ZTD service 310 are not accessible from the public Internet. In some cases, the original IP headers of packets sent by IoT devices 302 to ZTD service 310 are not modified, such as by a network address translation (NAT) service.

In some examples, the cellular SP network 306 can be configured to work with both the private APN associated with ZTD service 310, as well as with a target APN. In some examples, the cellular SP network 306 may be reconfigured to allow the SIM/eSIM/iSIM/etc., of an IoT device 302 to switch to the target APN in an orchestrated manner during onboarding of the IoT device 302.

The disclosure turns now to FIGS. 5A-5D, depicting a series of process for utilizing an initial trust relationship established between an IoT device and a ZTD service when the IoT device is authenticated by the ZTD service, to determine bootstrapping policy and/or to perform a number of post-authentication functions such as updating firmware, software, determining, maintaining the validity of the IoT device's certificate, etc.

Figure 5A:
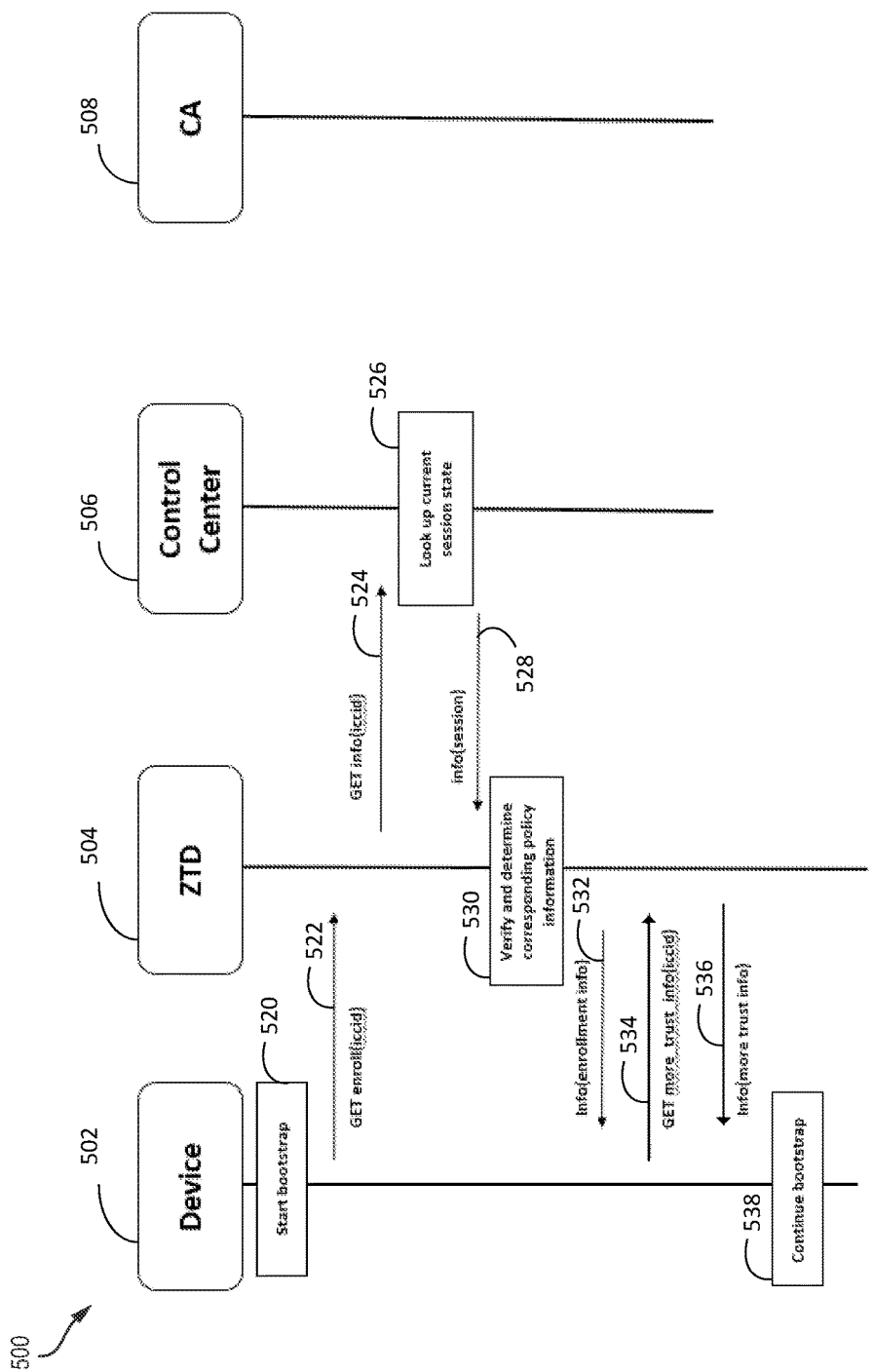
FIG. 5A illustrates a process for lifetime extension of bootstrap trust established between an IoT and a ZTD service, according to some aspects of the present disclosure.

FIG. 5A illustrates a process for lifetime extension of bootstrap trust established between an IoT and a ZTD service, according to some aspects of the present disclosure. Example process 500 of FIG. 5 will be described with reference to device 502 (which can be the same as client endpoints 116 described above with reference to FIGS. 1 and 2 and/or devices 302 described above with reference to FIG. 3), ZTD service 504 (which can be the same as ZTD service 310 described above with reference to FIG. 3), control center 506 (which can be the same as device management platform 312 described above with reference to FIG. 3), and a certificate authority (CA) 508 that may be configured to issue digital certificates used for authenticating IoT devices and establishing trust, as described above.

At step 520, IoT device 502 may initiate a bootstrap process for being authenticated using ZTD service 504. As part of the bootstrapping process, device 502 may send, at step 522, a GET enroll message to ZTD service 504 that includes the ICCID and IMEI of device 502.

At step 524, ZTD service 504, upon receiving the GET enroll message, may send a GET info message to control center 506 that includes the ICCID of device 502.

At step 526, control center 506 may perform a look up process to determine a current session state for device 502. A session state may, in one instance, relate to cellular registration, where the ICCID/IMEI (SIM to modem) is checked to determine a match. This is reported by the network on initial cellular attach and a change could indicate a SIM swap attack. In another instance, the current session state can include addressing information (ICCID, IMEI, IMSI, IP Address), connection information (currently connected, last contact), and meta data (location, movement, telemetry, subscriber fees paid). In another instance, a session state may be a Packet Data Protocol (PDP) session. A session may be opened when the device (e.g., device 502) initiates a PDP context (e.g., gets an IP address) and is closed when the device drops that connection. Intermediate updates are given by the network to report continuing activity for billing purposes. Control center 506 may verify that device 502 still has an active PDP context. Since control center 526 assigns the IP addresses via DHCP, control center 506 also verifies that the source IP address matches the originally assigned IP address as a further authentication method.

At step 528, control center 506 may response to ZTD service 504 with an information message (info(session) message) that includes the current session state information for device 502.

At step 530, ZTD service 504 may verify the current session information received from control center 506 and determine relevant network policy information pertaining to device 502. In one example, policy information (which may also be referred to and included in credential information referenced above and throughout the present disclosure) can include certificate renewal information for maintaining the validity of device certificate for device 502. In some examples, renewal information/policy can be flexible and based on any number of conditions. For example, the renewal policy can include no renewal of device 502's certificate, a specific time before or after expiration date of device 502's certificate, an intermittent period during which device 502's certificate is valid, avoiding a critical window for renewing device 502's certificate, or targeting a maintenance window for renewing device 502's certificate.

In some examples, such renewal policy may not be limited to device identity certificates for device 502 but may alternatively or additionally include policy related to maintenance of any of the trust anchor certificates installed on device 502.

In one example the verification and determining of corresponding policy information for device 502 may be carried out according to any known or to be developed process (e.g., using ICCID of device 502).

Thereafter, at step 532, ZTD service 504 may send an information message to device 502 (may also be referred to as Info or enrollment info message).

At step 534. ZTD service 504 may receive an additional request from device 502 (e.g., a GET message) requesting additional trust information.

In response and at step 536, ZTD service 504 may send a response to device 502 that includes additional trust information. Thereafter, device 502 may continue the bootstrapping process at step 538.

In one example, the additional trust information may include a secure boot key for device 502, software sign/verify keys for device 502, pre-shared encryption keys for device 502, license keys for device 502, or other credentials that for device 502 can utilize to verify firmware, software, data, and other information received from a third party out-of-band of the original ZTD bootstrap service.

In one example, ZTD service 504 may dynamically determine the additional trust information based on ZTD policy configuration. In one example, a ZTD policy may define the information sent to device 502. The information can include identity information, secure credentials, and configuration settings. The ZTD policy may define which pieces of information are sent and the values of each piece.

The ZTD policy can include both static components (every devices get the same piece of data) and dynamic components (conditional). Conditions can be implemented by template or logic using the information about the current session and the policy definitions to determine the information sent to the device. For example:

A device not known, not currently connected, or using wrong addressing information: request can be rejected.

Device in wrong location: request can be rejected.

Device in US: domestic specific information can be sent

Device in EMEA: European specific information can be sent.

Device belongs to customer #1, customer #1 specific information can be sent.

Conventionally, secure boot keys are installed at manufacture time, software sign/verify keys are installed at manufacture time or later by end user of device 502, software license keys are installed by end user of device 502 when software is purchased, encryption keys are installed by end user of device 502. According to the present disclosure, these credential information (which may also be referred to as trust artifacts or additional trust information) are installed on device 502 as part of bootstrapping process with ZTD service 504 such that any loss in an originally established trust between device 502 and ZTD service 504 (e.g., device 502 connecting to another network or losing connectivity to ZTD service 504) does not hamper device 502's subsequent attempts to download, install, and/or run various relevant firmware, software, download and utilize information from third-party sources, etc.

Figure 5B:
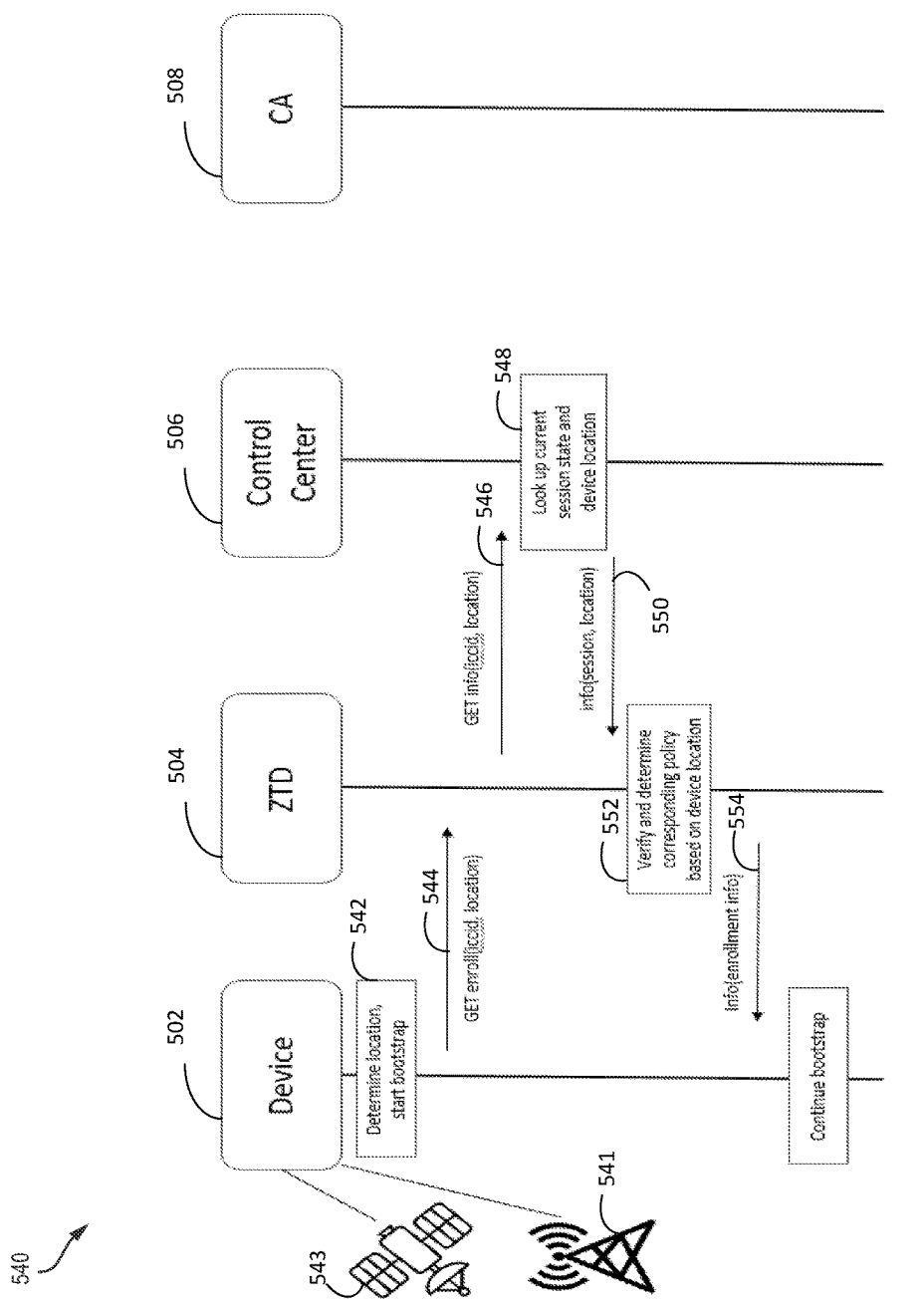
FIG. 5B illustrate a process for dynamic determination of bootstrap information for an IoT device based on geographical location, according to some aspects of the present disclosure.

FIG. 5B illustrate a process for dynamic determination of bootstrap information for an IoT device based on geographical location, according to some aspects of the present disclosure. In describing FIG. 5B, references will be made to device 502, ZTD service 504, control center 506, and/or CA 508.

According to example process 540 and starting at step 542, IoT device 502 may initiate a bootstrap process for being authenticated using ZTD service 504. As part of the bootstrapping process, at step 542, device 502 may send a GET enroll message to ZTD service 504 that includes the ICCID of device 502 (similar to step 522 of FIG. 5A) with an additional entry indicating the location of device 502 (real-time location information). In one example, device 502 may obtain its location information with a nearby access point (e.g., access point 541), from satellite 543 or any other type of known or to be developed location determining device with which device 502 can communicate.

At step 546 and similar to step 524, ZTD service 504, upon receiving the GET enroll message, may send a GET info message to control center 506 that includes the ICCID of device 502 and location information of device 502.

At step 548, control center 506 may perform a look up process to determine a current session state for device 502 and location information. Current session state may be the same as defined above. In one example, the location information can include information about the location of device 502 as available to control center 506, which can then be used in combination with real-time location information received from device 502.

At step 550, control center 506 may response to ZTD service 504 with an information message (info(session) message) that includes the current session state information for device 502 and location information determined by control center 506 (e.g., information about the location of device 502 as available to control center 506).

At step 552, ZTD service 504 may verify the current session information received from control center 506 and determine relevant network policy information pertaining to device 502 based on location information for device 502. In one example, ZTD service 504 may compare real-time location information of device 502 and information about the location of device 502 as available to control center 506, to determine bootstrapping policy for device 502. In one example such policy can include accepting or rejecting bootstrap requests from device 502, defining a geo-fence in which such bootstrapping request may be accepted or rejected, etc. In another example, such policy can include optimizing values sent to the device as part of bootstrapping, including the APN, IoT URI, device certificate subject field, and encryption method, based on geographic location.

In this disclosure, location information can include longitude/latitude information. Identification of a country, a building, a location within a building, a nearby physical structure such as a cell tower, etc. Location information can be determined from the cellular network. In one example, the cellular network may report the location as Location Area Code (LAC) and cell ID (which is the sector on the antenna array on the cell tower). Location information can further be determined using GPS coordinates, nearby radio signals from other sources, including WIFI and Bluetooth. Location verification by ZTD service 504 can be done with existing Control Center information or based on a new proof of location algorithm.

Thereafter, at step 554, ZTD service 504 may send an information message to device 502 (may also be referred to as Info or enrollment info message) that can include the bootstrapping policy dynamically determined at step 552 by ZTD 504. Device 502 may then continue with bootstrapping based on the bootstrapping policy specified in the enrollment info message.

At step 534 ZTD service 504 may receive an additional request from device 502 (e.g., a GET message) requesting additional trust information.

Figure 5C:
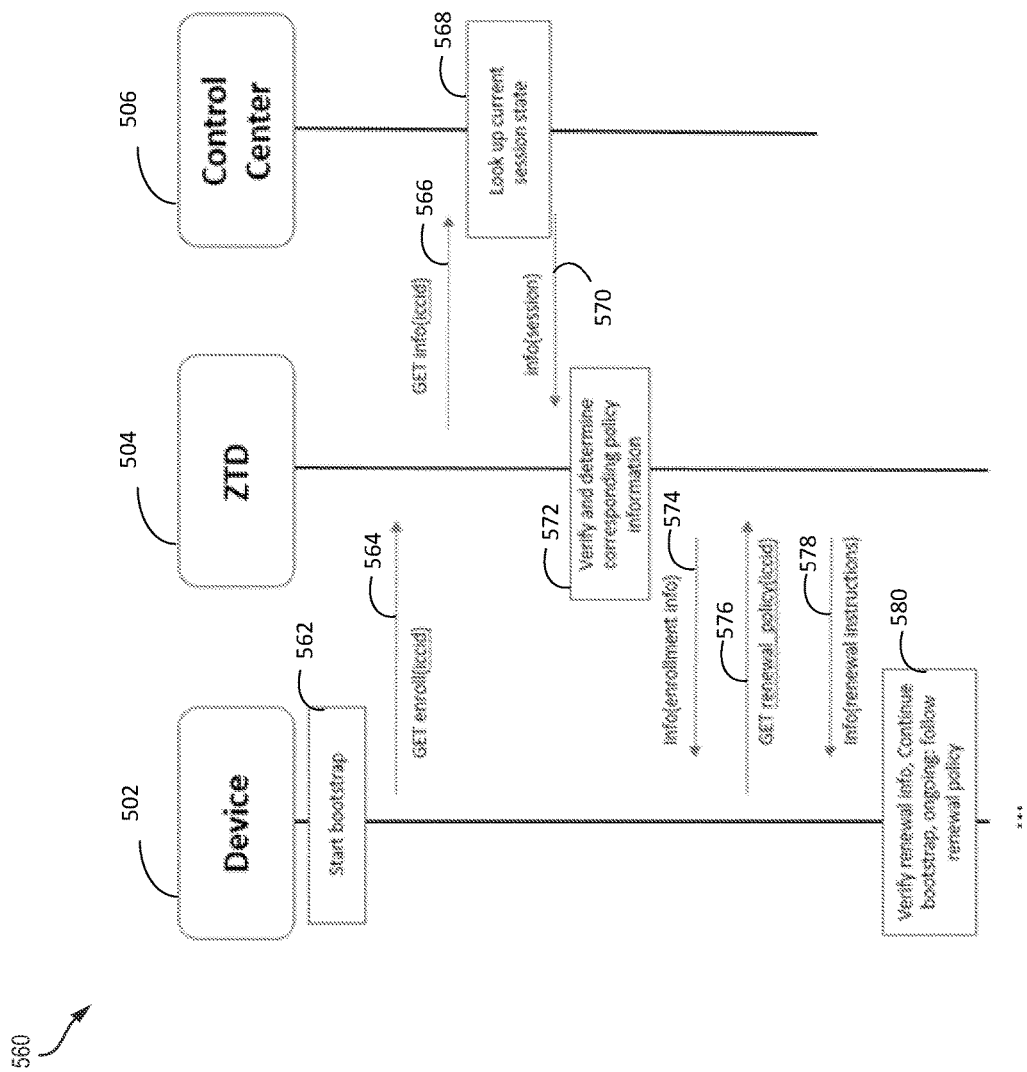
FIGS. 5C and 5D illustrate a process for managing re-enrollment of certificates of IoT devices, according to some aspects of the present disclosure.
Figure 5D:
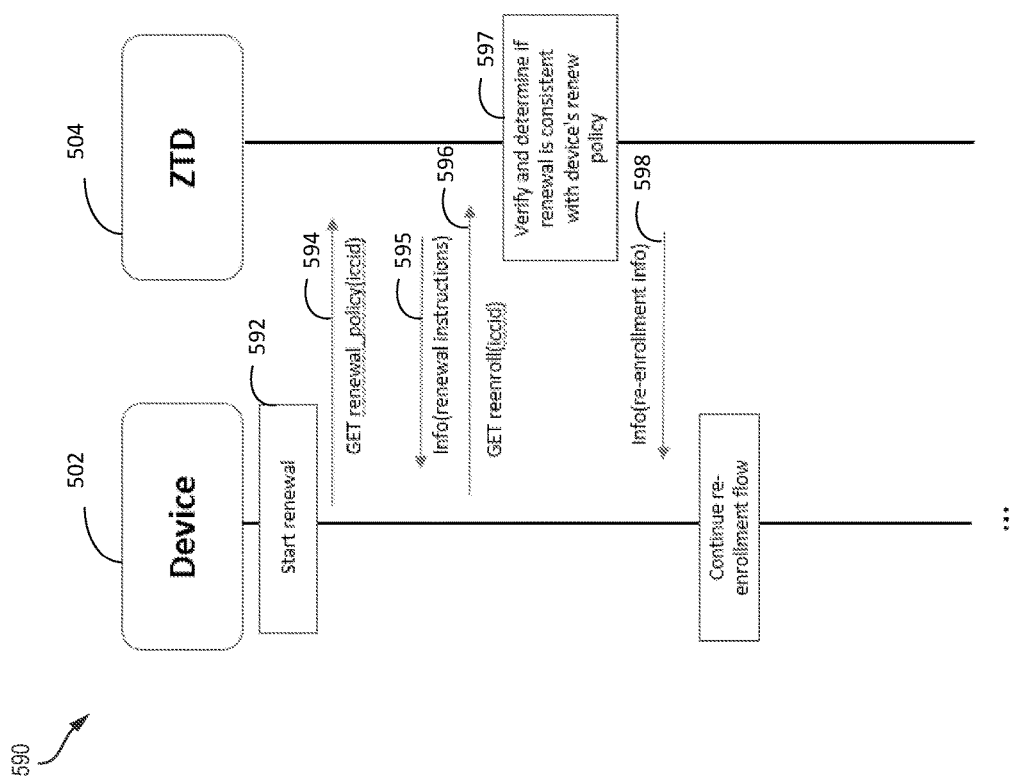

FIGS. 5C and 5D illustrate a process for managing re-enrollment of certificates of IoT devices, according to some aspects of the present disclosure. In describing FIGS. 5C and 5D, references will be made to device 502, ZTD service 504, control center 506, and/or CA 508.

FIG. 5C illustrates an example process 560 for initial certificate enrollment for device 502. This process may be similar to the process of FIG. 5A. For example, step 562 is the same as step 520 of FIG. 5A. Step 564 is the same as step 522 of FIG. 5A. Step 566 is the same as step 524 of FIG. 5A. Step 568 is the same as step 526 of FIG. 5A. Step 570 is the same as step 528 of FIG. 5A. Step 572 is the same as step 530 of FIG. 5A. Step 574 is the same as step 532 of FIG. 5A. Hence these steps will not be further described for sake of brevity.

In another examples, steps 562, 564, 566, 568, 570, 572, and 574 may be the same as steps 542, 544, 546, 548, 550, 552, and 554 of FIG. 5B. Hence these steps will not be further described for sake of brevity.

At step 576, ZTD service 504 may receive a message from device 502. In one example, this message may be a GET message requesting certificate renewal policy for device 502. In some examples, certificate renewal information/policy can be flexible and based on any number of conditions. For example, the renewal policy can include no renewal of device 502's certificate, a specific time before or after expiration date of device 502's certificate, an intermittent period during which device 502's certificate is valid, avoiding a critical window for renewing device 502's certificate, or targeting a maintenance window for renewing device 502's certificate.

At step 578, ZTD service 504 may send a response message back to device 502 with the certificate renewal information/policy. In one example, a different policy may be applied to each device (or group of devices) at bootstrap time. The policy can specify a different trigger for a device to request re-enrollment or not. For example, devices more at risk of loss can be configured to use minimal lifetime and last-minute renewals, while stable and secure devices may be allowed longer lifetime and hence longer pre-re-enrollment periods. In another example, devices with frequent network connectivity can wait until shortly before expiry of their certificate to renew theirs, and devices expecting unpredictable network connectivity may benefit from a more aggressive certificate re-enrollment polices.

At step 580, device 502 may verify the received certificate renewal policy, continue the bootstrapping process, and may follow the renewal policy for renewing its certificate.

FIG. 5D illustrates an example process 590 for certificate renewal of device 502 after the initial enrollment per the process of FIG. 5C. As can be seen from FIG. 5D, example process 590 takes place between device 502 and LTD 504. In one example, while the initial bootstrap process, per process 560 of FIG. 5C utilizes a bootstrap APN, the subsequent renewal process 590 can be implemented over an internet facing production APN.

Upon starting a certificate renewal process at step 592, device 502, at step 594, may send a message to ZTD service 504 (e.g., a GET renewal policy message) that includes the ICCID of device 502.

In response and at step 595, ZTD 504 may send a response message back to device 502 with instructions for certificate renewal.

At step 596 and after installing the renewal instructions, device 502 may send another request to ZTD service 504. This message can be a GET reenroll message with Device 502's ICCID.

At step 597, ZTD service 504 verifies device 502 and determines if the renewal request received from device 502 at step 596 is consistent with device 502's renewal policy. Once such verification is complete, at step 598, ZTD service 504 sends a response to device 502 with certificate re-enrollment information.

At step 599, device 502 may perform one or more additional steps (as know or to be developed) for completing the certificate renewal process with ZTD 504.

Figure 6:
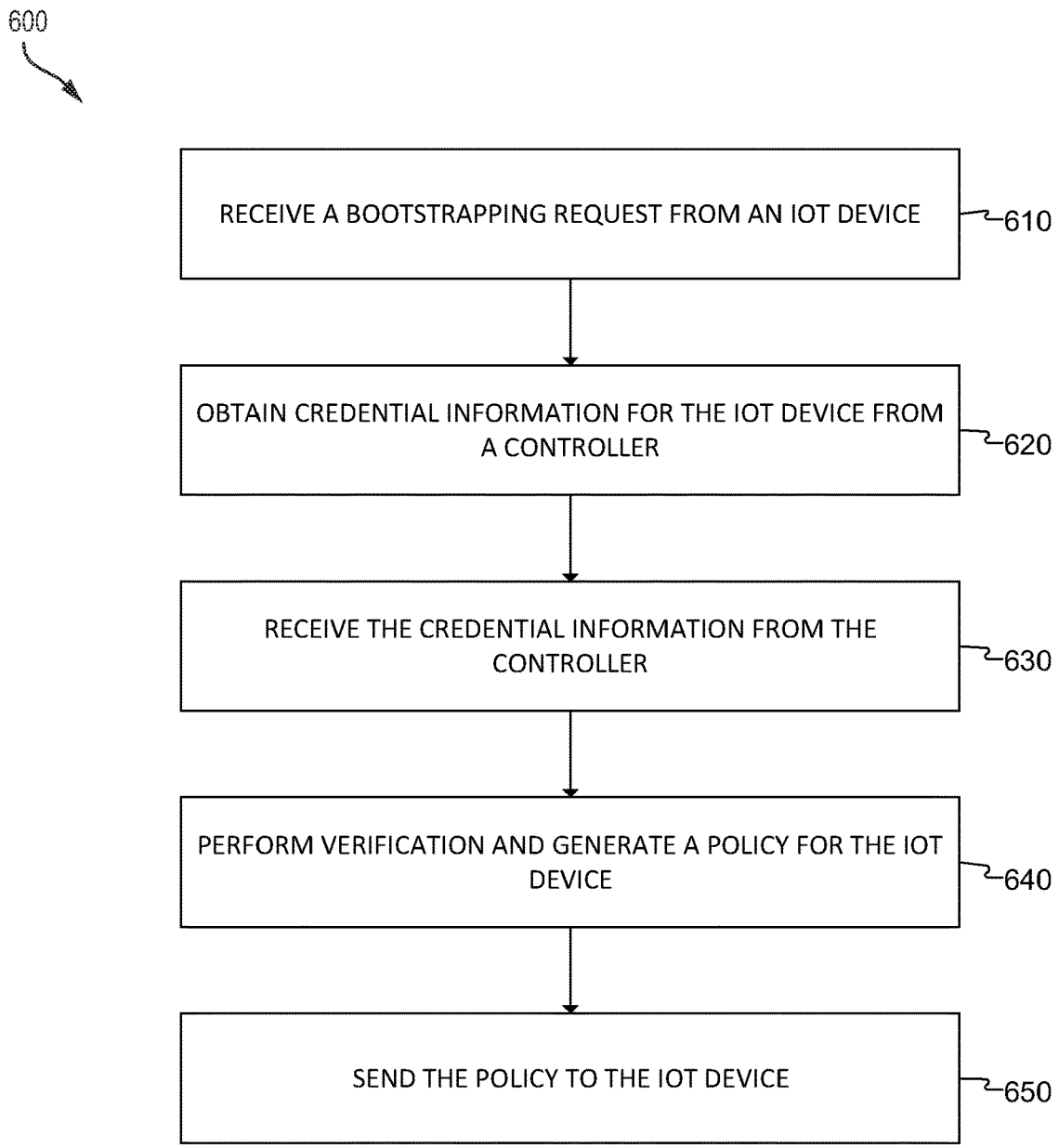
FIG. 6 illustrates an example bootstrapping and certificate re-enrollment management method, according to some aspects of the present disclosure.
Figure 7:
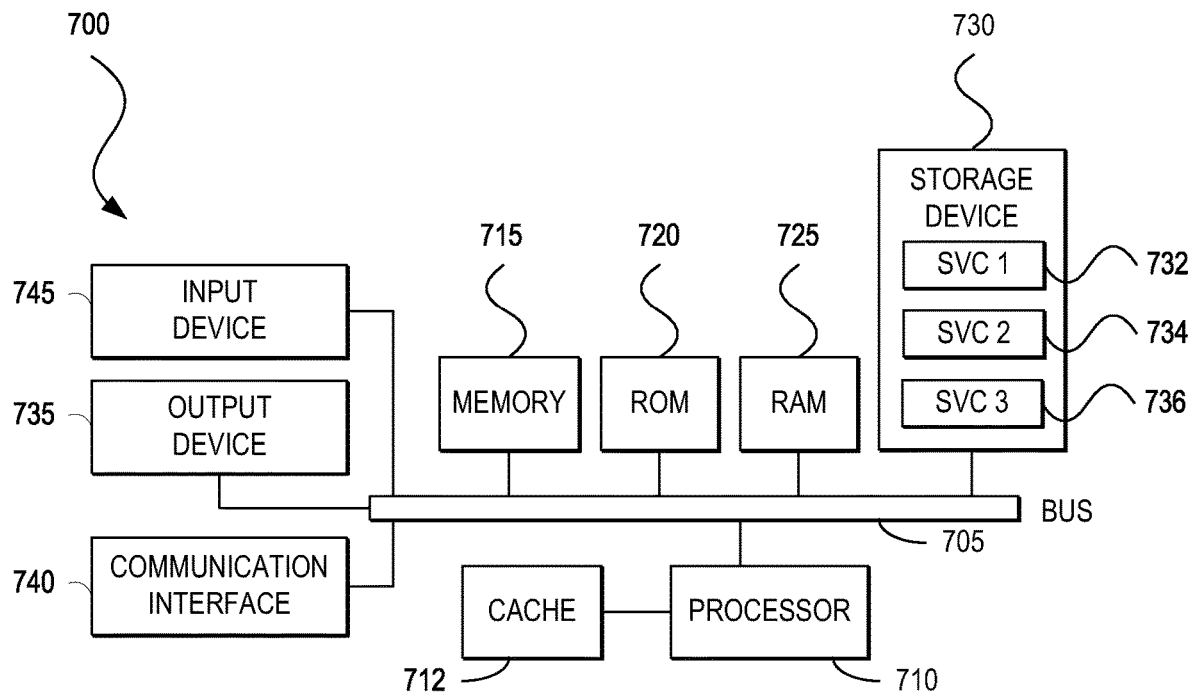
FIG. 7 illustrates an example system for implementing certain aspects of the present technology, according to some aspects of the present disclosure.

FIG. 6 illustrates an example bootstrapping and certificate re-enrollment management method, according to some aspects of the present disclosure. FIG. 6 will be described from the perspective of ZTD service 504 (may also be referred to as one of a controller, a network controller, or an IoT management component). It should be understood that ZTD service 504 may be implemented on a network node having one or more processors configured to execute computer-readable instructions stored on one or more associated memories to implement the steps described below. In describing example method 600 of FIG. 6, references may be made to one or more elements and/or processes described above with reference to FIGS. 3-5A-D.

At step 610, ZTD 504 may receive a bootstrapping request from an IoT device (e.g., device 502). In one example such request may include an ICCID of the IoT device and/or geographical location (real-time geographical location) information of the IoT device. This process may be implemented in a similar manner as steps 522 of FIG. 5A, 544 of FIG. 5B, and/or 564 of FIG. 5C.

At step 620, ZTD service 504 may send a message to another network controller (e.g., control center 506) to request credential information for the IoT device. This process may be the same as steps 524 of FIG. 5A, 546 of FIG. 5B, and/or 566 of FIG. 5C.

At step 630, ZTD service 504 may receive the credential information from the network controller (control center 506). This process may be the same as steps 528 of FIG. 5A, 550 of FIG. 5B, and/or 570 of FIG. 5C. As noted above with reference to steps 526 of FIG. 5A, 548 of FIG. 5B, and 568 of FIG. 5C, the credential information can include session state of IoT device 502, geographical location information of IoT device 502 as known to control center 506, etc.).

As described above, in one example, the credential information can include digital keys for managing one or more of software updates or information associated with the IoT device. In another example, the credential information can include one or more device policies identifying a duration of validity of a digital certificate associated with the IoT device. In some examples, the one or more device policies are location dependent (e.g., based on the real-time location information of the IoT device and/or location information of the IoT device as known to control center 506).

At step 640, ZTD service 504 may perform a verification process and generate a policy (may also be referred to as an enrollment and bootstrapping policy) for the IoT device. This process may be the same as steps 530 of FIG. 5A, 552 of FIG. 5B, and/or 572 of FIG. 5C.

In one example, the verification process can include comparing the location information (real-time location information of the IoT device) with geographical location information of IoT device 502 as known to control center 506 (second location information) received from control center 506 to determine if bootstrapping the IoT device is authorized.

In some examples, the policy can include a device certificate re-enrollment policy as described above with reference to FIG. 5D and the IoT device can a certificate re-enrollment process based on a triggering condition identified in the re-enrollment policy. The triggering condition, as described above, can be defined in any number of ways. For example, IoT devices more at risk of loss can be configured to use minimal lifetime and last-minute renewals, while stable and secure IoT devices may be allowed longer lifetime and hence longer pre-re-enrollment periods. In another example, IoT devices with frequent network connectivity can wait until shortly before expiry of their certificate to renew theirs, and IoT devices expecting unpredictable network connectivity may benefit from a more aggressive certificate re-enrollment polices.

At step 650, ZTD service 504 may send the policy to the IoT device from which the bootstrapping request is received at 610 in order for the IoT device to complete the corresponding bootstrapping process with ZTD service 504, perform certificate re-enrollment where applicable, etc.

In one or more examples, implementing processes described above with reference to FIGS. 5A-D and 6, would advantageously eliminate the need for having to pre-program each IoT device such as device 502 with information that device 502 would need to perform any of tasks such as certificate re-enrollment, firmware/software updates, communicate with third-party network devices and exchange data therewith, etc. For example, certificate re-enrollment policies, bootstrapping policies would have to be pre-programmed upon installation of device 502 or the initial set-up process. Furthermore, any software updates that may be security related or otherwise, would have to be manually carried out for each IoT device, which given their increasing field use and the large number of IoT devices being used for various purposes in a given network, would require a significant resource allocation and manpower.

The present disclosure eliminates the need for such manual processes and introduces a dynamic and automated mechanism for providing bootstrapping and certificate re-enrollment policies and various software and security updates to each connected IoT device.

FIG. 7 illustrates a computing system architecture, according to some aspects of the present disclosure. Components of computing system architecture 700 are in electrical communication with each other using a connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method of managing Internet of Thing (IoT) devices, comprising:
   receiving, at an IoT management component, a bootstrapping request from an IoT device, the request including location information of the IoT device;
   after receiving the bootstrapping request from the IoT device, receiving, at the IoT management component and from a controller communicatively coupled to the IoT management component, credential information for the IoT device, wherein the credential information includes at least one of: (a) at least one digital key for managing one or more of software updates associated with the IoT device and (b) one or more device policies, identifying at least one of a duration of validity of a digital certificate associated with the IoT device;
   generating a policy for bootstrapping the IoT device based at least on the location information and the credential information; and
   sending the policy to the IoT device for the IoT device to complete the bootstrapping.

2. The method of claim 1, wherein the one or more device policies are location dependent.

3. The method of claim 1, further comprising:
   comparing the location information with second location information received from the controller to determine if bootstrapping the IoT device is authorized.

4. The method of claim 1, wherein
   the policy includes a device certificate re-enrollment policy, and
   the IoT device performs a certificate re-enrollment process based on a triggering condition identified in the device certificate re-enrollment policy.

5. A network controller comprising:
   one or more memories having computer-readable instructions stored thereon; and
   one or more processors configured to execute the computer-readable instructions to:
   receive a bootstrapping request from an Internet of Things (IoT) device, the request including location information of the IoT device;
   after receiving the bootstrapping request from the IoT device, receive, at the network controller and from a controller communicatively coupled to the network controller, credential information for the IoT device, wherein the credential information includes at least one of: (a) at least one digital key for managing one or more of software updates associated with the IoT device and (b) one or more device policies, identifying at least one of a duration of validity of a digital certificate associated with the IoT device;
   generate a policy for bootstrapping the IoT device based at least on the location information and the credential information; and
   send the policy to the IoT device for the IoT device to complete the bootstrapping.

6. The network controller of claim 5, wherein the one or more device policies are location dependent.

7. The network controller of claim 5, wherein the one or more processors are configured to execute the computer-readable instructions to compare the location information with second location information received from the controller to determine if bootstrapping the IoT device is authorized.

8. The network controller of claim 5, wherein the policy includes a device certificate re-enrollment policy.

9. The network controller of claim 8, wherein the IoT device performs a certificate re-enrollment process based on a triggering condition identified in the device certificate re-enrollment policy.

10. One or more non-transitory computer-readable media comprising computer-readable instructions, which when executed by one or more processors of a network controller, cause the network controller to:
    receive a bootstrapping request from an Internet of Things (IoT) device, the request including location information of the IoT device;
    after receiving the bootstrapping request from the IoT device, receive, at the network controller and from a controller communicatively coupled to the network controller, credential information for the IoT device, wherein the credential information includes at least one of: (a) at least one digital key for managing one or more of software updates associated with the IoT device and (b) one or more device policies, identifying at least one of a duration of validity of a digital certificate associated with the IoT device;
    generate a policy for bootstrapping the IoT device based at least on the location information and the credential information; and
    send the policy to the IoT device for the IoT device to complete the bootstrapping.

11. The one or more non-transitory computer-readable media of claim 10, wherein the execution of the computer-readable instructions by the one or more processors, further cause the network controller to compare the location information with second location information received from the controller to determine if bootstrapping the IoT device is authorized.

12. The one or more non-transitory computer-readable media of claim 10, wherein
    the policy includes a device certificate re-enrollment policy, and
    the IoT device performs a certificate re-enrollment process based on a triggering condition identified in the re-enrollment policy.

* * * * *